United States Patent [19]

Chen et al.

[11] Patent Number: 4,863,614

[45] Date of Patent: Sep. 5, 1989

[54] WATER TREATMENT POLYMERS AND METHODS OF USE THEREOF

[75] Inventors: Fu Chen, Newtown; William S. Carey, Ridley Park, both of Pa.

[73] Assignee: Betz Laboratories, Inc., Trevose, Pa.

[21] Appl. No.: 313,579

[22] Filed: Feb. 21, 1989

Related U.S. Application Data

[60] Division of Ser. No. 191,309, May 6, 1988, which is a continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^4$ ............................................. C02F 5/14
[52] U.S. Cl. ................................. 210/699; 210/700; 210/701; 252/180
[58] Field of Search ............................. 210/698–701; 252/180, 181; 526/271, 278

[56] References Cited

U.S. PATENT DOCUMENTS

| | | | |
|---|---|---|---|
| 2,634,296 | 4/1953 | Morris et al. | 568/648 |
| 2,723,971 | 11/1955 | Cupery | 525/60 |
| 2,847,477 | 8/1958 | Watanabe et al. | 568/626 |
| 2,847,478 | 8/1958 | Hwa et al. | 568/626 |
| 3,175,998 | 3/1965 | Rabinowitz | 526/278 |
| 3,228,979 | 1/1966 | Gaertner | 260/512 R |
| 3,262,903 | 7/1966 | Robertson | 260/37 |
| 3,549,548 | 12/1970 | Newman | 252/181 |
| 3,706,717 | 12/1972 | Siegele | 210/701 |
| 3,799,893 | 3/1974 | Quinlan | 260/2 BP |
| 3,891,568 | 12/1975 | Nishio et al. | 422/15 |
| 3,989,636 | 11/1976 | Domba | 252/180 |
| 3,992,318 | 11/1976 | Gaupp et al. | 252/389 |
| 4,018,702 | 4/1977 | Boffardi | 252/389 |
| 4,029,577 | 6/1977 | Godlewski et al. | 210/701 |
| 4,046,707 | 9/1977 | Smith et al. | 252/180 |
| 4,095,029 | 6/1978 | Fields | 560/87 |
| 4,149,969 | 4/1979 | Robitaille et al. | 252/181 |
| 4,176,059 | 11/1979 | Suzuki | 210/698 |
| 4,207,405 | 6/1980 | Masler et al. | 525/328 |
| 4,209,398 | 6/1980 | Ii et al. | 252/180 |
| 4,288,327 | 7/1986 | Godlewski et al. | 210/698 |
| 4,303,568 | 12/1981 | May et al. | 422/13 |
| 4,324,684 | 4/1982 | Geiger et al. | 252/389 |
| 4,432,879 | 2/1984 | Greaves et al. | 210/699 |
| 4,457,847 | 12/1987 | Lorenc | 210/698 |
| 4,469,615 | 9/1984 | Tsuruoka et al. | 252/180 |
| 4,490,308 | 12/1984 | Fong et al. | 260/513 |
| 4,500,693 | 2/1985 | Takehara et al. | 526/240 |
| 4,546,156 | 10/1985 | Fong et al. | 526/240 |
| 4,560,481 | 12/1985 | Hollander | 210/697 |
| 4,575,425 | 3/1986 | Boffardi et al. | 210/697 |
| 4,640,793 | 2/1987 | Persinski | 210/700 |
| 4,650,591 | 3/1987 | Boothe et al. | 210/700 |
| 4,659,480 | 4/1987 | Chen | 210/697 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,678,840 | 7/1987 | Fong et al. | 525/340 |
| 4,701,262 | 10/1987 | Chen | 210/699 |
| 4,708,815 | 11/1987 | Chen | 252/181 |
| 4,717,499 | 1/1988 | Chen | 252/181 |
| 4,732,698 | 3/1988 | Chen | 252/181 |
| 4,759,851 | 7/1988 | Chen | 210/697 |
| 4,782,120 | 11/1988 | Rousset et al. | 525/326.6 |

FOREIGN PATENT DOCUMENTS

| | | |
|---|---|---|
| 0142929 | 5/1985 | European Pat. Off. . |
| 2522637 | 12/1976 | Fed. Rep. of Germany . |
| 53-075138 | 7/1978 | Japan . |
| 56-155692 | 12/1981 | Japan . |
| 58-7415 | 1/1983 | Japan . |
| 58-9987 | 1/1983 | Japan . |
| 58-147412 | 9/1983 | Japan . |
| 58-154761 | 9/1983 | Japan . |
| 58-171576 | 10/1983 | Japan . |
| 62-015203 | 1/1987 | Japan . |
| 1491701 | 11/1977 | United Kingdom . |

OTHER PUBLICATIONS

Chemical Abstract–78:16850y, 1973, 85:20537p, 1974, 98:203736r, 1983, 99:58708x, 1983.
Alcolac Technical Literature.
Corrosion, vol. 2, Shreir, 1976.
Hampshire Amino Acid Intermediates, W. R. Grace Co., 1975.

*Primary Examiner*—Peter Hruskoci
*Attorney, Agent, or Firm*—Alexander D. Ricci; Gregory M. Hill

[57] ABSTRACT

New composition of polymers and methods of use are disclosed. The polymers are water soluble and are composed of repeat units formed from an $\alpha,\beta$ ethylenically unsaturated compound, and repeat units formed from allyl alkylene phosphonates.

10 Claims, No Drawings

WATER TREATMENT POLYMERS AND METHODS OF USE THEREOF

CROSS REFERENCE RELATED APPLICATIONS

This is a divisional of application Ser. No. 191,309 filed May 6, 1988 which is a continuation-in-part of application Ser. No. 037,484 filed Apr. 13, 1987, now U.S. Pat. No. 4,759,851, which is a continuation of Ser. No. 864,049 filed May 16, 1986, now U.S. Pat. No. 4,659,481, which in turn is a continuation of Ser. No. 545,563, filed Oct. 26, 1983, now abandoned.

FIELD OF THE INVENTION

The present invention pertains to a composition and method of utilizing same to control the formation and deposition of scale imparting compounds in water systems such as cooling, boiler and gas scrubbing systems.

BACKGROUND OF THE INVENTION

The problem of scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa., pages 85-96, the formation of scale and sludge deposits on boiler 5 heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, deposition on the structural parts of a steam generating system causes poorer circulation and lower heat transfer capacity, resulting in an overall loss in efficiency.

SUMMARY OF THE INVENTION

The present invention is directed to new water soluble allyl alkylene phosphonate copolymers and terpolymers for water treatment. Specifically, the novel copolymers of the invention comprise repeat units having the structure:

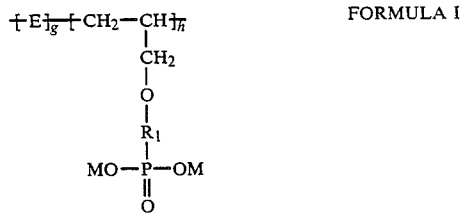

FORMULA I wherein E in the above formula is the repeat unit after polymerization of an $\alpha, \beta$ ethylenically unsaturated compound, preferably carboxylic acid, amide form thereof, or lower alkyl ($C_1$–$C_6$) ester or hydroxylated lower alkyl ($C_1$–$C_6$) ester of such carboxylic acid. Compounds encompassed by E include the repeat unit after polymerization of acrylic acid, methacrylic acid, acrylamide, maleic acid or anhydride, styrene, styrene sulfonic acid and itaconic acid; and the like. Water soluble salt forms of the acids are also within the purview of the invention.

One or more differently structured monomers may be used as the E constituent provided that they fall within the definition of E above given. One such preferred mixture of E monomers would be acrylic acid/2-hydroxypropyl acrylate.

$R_1$ in the above formula (Formula I) is a hydroxy substituted lower alkylene group having from about 1 to 6 carbon atoms or a non-substituted lower alkylene group having from 1 to 6 carbon atoms. M in Formula I is hydrogen, a water soluble cation (e.g., $NH_4^+$, alkali metal) or a non-substituted lower alkyl group having from 1 to 3 carbon atoms.

Polymer structure of the present invention is disclosed in U.S. application Ser. No. 545,563.

PRIOR ART

The nomenclature of phosphorus compounds is sometimes ambiguous. To clarify the notations, we are following the teachings by G. M. Kosolapoff in *Organophosphorous Compounds* (Wiley, 1950, pages 3 and 4) and by Emsley and Hall in *The Chemistry of Phosphorus* (Harper and Row, 1976, pages 512-515): "the acids in which phosphorus has the oxidation state (III) have the '-ous' ending and their salts and esters have the '-ite' ending. Those with oxidation state (V) have corresponding '-ic' and '-ate' endings. $P(OH)_3$ is called phosphorus acid although it exists in the rearranged form $HP(O)(OH)_2$ which is phosphonic acid. $MeP(O)(OEt)_2$ with a C—P linkage is referred as diethyl methane phosphonate and $(MeO)_2P(O)OH$ with two C—O —P linkages is dimethyl phosphate and $(EtO)_2POH$ which can have a P—H bond is diethyl phosphite".

(Takehara, et al.) U.S. Pat. No. 4,500,693 discloses sundry copolymers composed of a (meth) acrylic acid monomer and an allylic ether monomer. Such polymers are disclosed as being useful dispersants and scale preventing agents that may be used in cooling water or water collection systems, etc. In accordance with the '693 disclosure, the allylic ether monomer may include, inter alia, the reaction product of allyloxy dihydroxypropane with various reagents, such as, ethylene oxide, phosphorus pentoxide, propylene oxide, monoaryl sorbitan, etc. When phosphorus pentoxide is reacted with allyloxydihydroxypropane, the resulting product is reported to contain phosphate functionality, i.e., with a C—O—P linkage.

U.S. Pat. Nos. 4,659,480 and 4,708,815 (Chen et al. continuation of Ser. No. 545,563) disclose the reaction of allyl glycidyl ether with phosphorus acid ($H_3PO_3$) which results to allyloxy hydroxypropyl phosphite with a distinct C—O—P—H structure. Water soluble copolymer and terpolymer are then prepared using the phosphite containing monomer. These disclosures are in contrast to the phosphonate functionality bonded to the polymer matrix in accordance with the present invention, where the linkage is C—$PO_3H_2$.

(Smith et al.) U.S. Pat. No. 4,046,707 describes polyacrylic acid containing one terminal phosphonate group or one internal phosphonate group. The precise structure of their disclosed compounds are difficult to identify due to the vague $^{31}P$ NMR information given in the reference. The polymerization procedure in the present invention is markedly different from Smith or Takehara. The phosphonate monomer is isolated first, then copolymerized it with acrylic acid to form a polymer containing multiple phosphonate groups.

Of further interest to the present invention is (Masler, et. al.) U.S. Pat. No. 4,207,405 wherein water treatment usage of certain phosphorus acid/carboxylic polymer reaction products, is taught. Specific teachings of this reference include reaction of poly (meth) acrylic acid with phosphorus acid or precursor thereof to yield a hydroxydiphosphonic acid adduct with the polymer. The disclosed reaction must be carried out under anhydrous conditions, with the product then being hydrolyzed in an aqueous medium. The precise structure of the reaction product is difficult to identify and contains only low levels of phosphorus substitution.

Of lesser interest are (Robertson) U.S. Pat. No. 3,262,903 and (Cupery) U.S. Pat. No. 2,723,971 which teach reaction of a polyepoxide with orthophosphoric acid to provide a polymer having a phosphoric acid ester substituent. The resulting polymeric phosphate is soluble in organic solvents and is useful as a film forming ingredient in coating compositions. It cannot be used in the water treatment field wherein water solubility is an essential criterion.

Other prior art patents and publications which may be of interest include: (Fong, et al.) Japanese Pat. No. 56-155692, U.S. Pat. No. 4,678,840 and (Boothe, et al.) U.S. Pat. No. 4,650,591. In the '840 and '591 patents, phosphonate group bonded to a vinyl amide moiety is disclosed. They are different structures than the present invention where a hydroxylated alkylene allyl ether is connected to the phosphonate group. The allyl ether linkage is also more hydrolytically and thermally stable than the amide linkage.

DETAILED DESCRIPTION OF THE INVENTION

In accordance with the invention, new water soluble copolymers and terpolymers, as shown in Formula I hereinafter, are synthesized. The water soluble copolymers and terpolymers of the invention comprise repeat units having the structures:

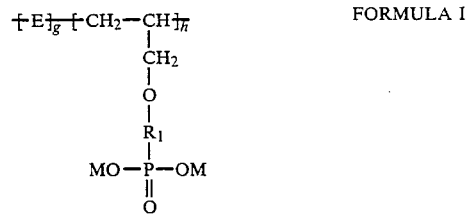

FORMULA I wherein E in the above formula is the repeat unit after polymerization of an $\alpha$, $\beta$ ethylenically unsaturated compound, preferably carboxylic acid, amide form thereof, or lower alkyl ($C_1$–$C_6$) ester or hydroxylated lower alkyl ($C_1$–$C_6$) ester of such carboxylic acid. Compounds encompassed by E include the repeat unit after polymerization of acrylic acid, methacrylic acid, acrylamide, maleic acid or anhydride, styrene, styrene sulfonic acid and itaconic acid, and the like. Water soluble salt forms of the acids are also within the purview of the invention.

One or more differently structured monomers may be used as the E constituent provided that they fall within the definition of E above given. One such preferred mixture of E monomers would be acrylic acid/2-hydroxypropyl acrylate.

$R_1$ in the above formula (Formula I) is a hydroxy substituted lower alkylene group having from about 1 to 6 carbon atoms or a non-substituted lower alkylene group having from 1 to 6 carbon atoms. M in Formula I is hydrogen, a water soluble cation (e.g., $NH_4^+$, alkali metal), or a non-substituted lower alkyl group having from 1 to 3 carbon atoms.

The molar ratio of the monomers (g:h) of Formula I may fall within the range of 30:1 to 1:20, with a molar ratio (g:h) of about 10:1 to 1:5 being preferred.

The number average molecular weight of the water soluble copolymers of Formula I may fall within the range of 1,000 to 1,000,000. Preferably, the number average molecular weight will be within the range of about 1,500 to about 500,000. The key criterion is that the polymer be water soluble.

As to preparation of the monomer designated as 9 hereinabove, these may be in accordance with well known techniques. For instance, one such possible monomer, acrylic acid, may be prepared by hydrolysis of acrylonitrile or by oxidation of acrolein.

As to the allyl monomer (monomer h), this may be prepared in accordance with the disclosure of U.S. Pat. No. 4,659,481 (sections 3 and 4) using allyl glycidyl ether (AGE) as a reactants or it may more preferably be prepared by a ring opening reaction using diethyl oxiranylmethyl phosphonate precursor to prepare the diethyl 1-allyloxy hydroxypropyl phosphonate monomer. This is then followed by dealkylation of the phosphonate ester to prepare the preferred allyloxy hydroxy phosphonic acid. To prepare the other acceptable 1-allyloxy hydroxyl ($C_1$–$C_6$) phosphonate monomers, the skilled artisan will simply utilize the corresponding epoxide.

Diethyl oxiranylmethyl phosphonate is reacted with allyl alcohol to form a mixed monomer solution in accordance with the equation:

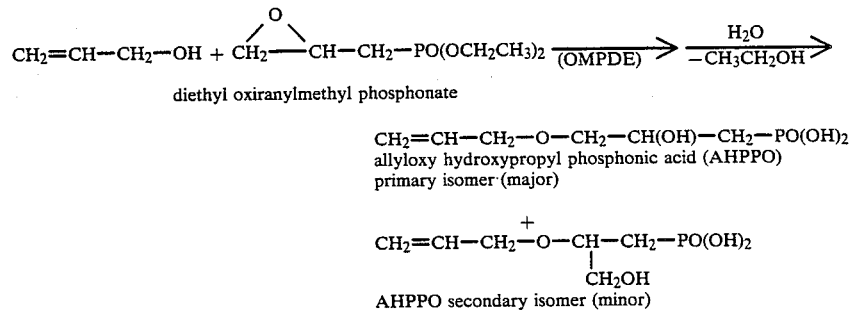

diethyl oxiranylmethyl phosphonate $CH_2=CH-CH_2-O-CH_2-CH(OH)-CH_2-PO(OH)_2$
allyloxy hydroxypropyl phosphonic acid (AHPPO)
primary isomer (major)

+

$CH_2=CH-CH_2-O-CH-CH_2-PO(OH)_2$
                        |
                        $CH_2OH$
AHPPO secondary isomer (minor)

The reaction may be carried out in anhydrous conditions with a reaction temperature ranging from 25° to 98° C. For each mole of epoxide used, 1.0 to about 20.0 moles of allyl alcohol may be used. Allyl phosphonic acid may be present in the mixed monomer solution which is from the presence of residual diethyl allyl phosphonate (associated with diethyl oxiranylmethyl phosphonate).

The IUPAC nomenclature for diethyl epoxymethyl phosphonate is phosphonic acid, (oxiranylmethyl)-diethyl ester [CAS registry number: 7316-37-2], which can be prepared from the epoxidation of diethyl allyl phosphonate in accordance to the equation:

$CH_2=CH-CH_2-PO(OCH_2CH_3)_2$ +
Diethyl allyl phosphonate m-chloroperbenzoic acid $\longrightarrow$

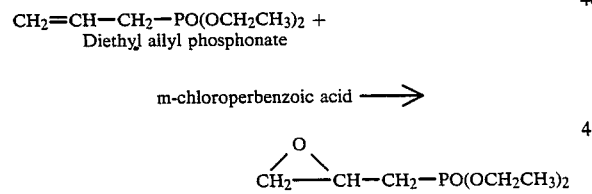

A small amount of unreacted diethyl allyl phosphonate may be present after the reaction. Without further purification, this diester will hydrolyze to allyl phosphonic acid and be copolymerized with monomers E and h in Formula I.

The structures of the preferred allyloxy hydroxypropyl phosphonates (AHPPO) were substantiated by 31P and 13C NMR spectroscopy and IR spectra. The 31P NMR spectra showed a major resonance at 28.65 and a minor resonance at 29.00 ppm downfield from the external phosphoric acid standard. These were assigned to the primary and secondary isomers of allyloxy hydroxypropyl phosphonates (AHPPO), respectively. A resonance at 28.13 ppm was assigned as allyl phosphonic acid (APA). A trace amount of phosphate and phosphonate compounds were noted at 1.32, 30.50 and 35.58 ppm. The 13C NMR showed the primary. AOHPP at 31.00 (J=137 Hz), 65.58, 71.87, 73.71 (J =14 Hz), 118.29, and 133.90 ppm downfield from external dioxane. Allyl phosphonic acid was detected at 32.0 (J =133 Hz), 120.0 and 128.0 ppm. The IR spectra showed a weak C—P stretch at 770 cm−1.

It is noted that the Na ion present in the AHPPO monomer above may be replaced with hydrogen, K, $NH_4^+$, or any water soluble cation. The Na ion may also be replaced by an organic amine group or lower alkyl group of from about 1–3 carbon atoms. The molar ratio of the AGE:AHPPO components in the mixed monomer solution may be varied to result in different ratios of these two components in the resulting polymer.

If desired, allyl phosphonic acid may be removed from the mixed monomer solution (i.e., leaving an aqueous solution of the two AHPP monomers) via distillation, solvent extraction, etc. At present, it is preferred to utilize the mixed monomer solution as it is produced (which therefore includes allyl phosphonic acid (APA)). In such cases, after polymerization, the resulting polymer comprises allyl phosphonic acid (APA) which incorporates into the polymeric matrix along with the AHPPO isomers. When the APA component of the mixed monomer solution is not removed, the resulting polymer may comprise:

|  | mole % |
| --- | --- |
| α, β ethylenically unsaturated monomer | 40–90 |
| APA | 0–25 |
| AHPPO | 2–50 | with the foregoing adding up to 100 mole %.

When allyl glycidyl ether (AGE) is used as a reagent to prepare the AHPPO monomer in accordance with the disclosure of U.S. Pat. No. 4,659,481, glyceryl allyl ether (hydrolysis product of AGE) may be formed. Similarly, glyceryl allyl ether may bq separated from the preferred monomer h or be copolymerized with monomers g and h of Formula I. Therefore, they are also within the scope of this invention.

After the desired monomers are produced and isolated, radical polymerization may proceed in solution, suspension, bulk, emulsion or thermal polymerization form. For instance., in suspension polymerization, the reaction may be initiated by an azo compound or an organic peroxide, with the monomers suspended in hexane or other organic reagents. On the other hand, in solution polymerization, the reaction may be initiated via conventional persulfate or peroxide initiators. Commonly used chain transfer agents such as lower alkyl alcohols, amines or mercapto compounds may be used to regulate the molecular weight. An accelerator such as sodium bisulfite or ascorbic acid may also be used.

The fact that polymers were formed by the above method was substantiated by viscosity increase, gel permeation chromatography, $^{13}$C and $^{31}$P NMR spectroscopy. The 13C NMR spectra showed a broad, polymer type backbone with complex C—O region (62–74 ppm) and no evidence of unreacted monomers. The $^{31}$P NMR spectra were similar to that of allyloxy hydroxypropyl phosphonate but with broader absorption, an indication of polymer formation.

Since, in accordance with the preferred method for obtaining the phosphonate monomer, minor amounts of allyl phosphonic acid may incorporate into the polymeric matrix when the preferred synthetic route, including use of the mixed monomer solution is used, the resulting polymer comprises repeat units having the structures:

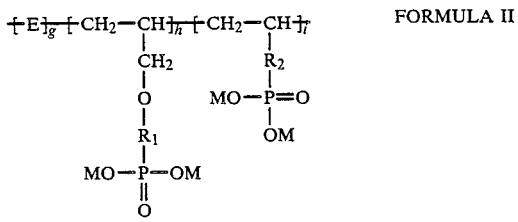

FORMULA II wherein g, h an M are the same as in Formula I. R$_2$ is a lower alkylene group having from about 1–4 carbon atoms. Monomer i may be present in a molar amount of between about 0–25%, with monomer g being present in a molar amount of between about 40–90%. Monomer h is present in an amount of about 2–50%. All foregoing molar percentages should add up to 100%.

It should be mentioned that other water soluble terpolymers comprising monomers E and h of Formula II may also be prepared. For instance, 1-allyloxy-2-hydroxypropyl sulfonate may be incorporated into a water soluble terpolymer backbone having repeat units from E and h. Therefore, it is also within the scope of the invention.

The specific preferred polymer is a terpolymer of acrylic acid/allyloxy hydroxypropyl phosphonic acid/allyl phosphonic acid (present in only a minor amount) comprising repeat units having the structures:

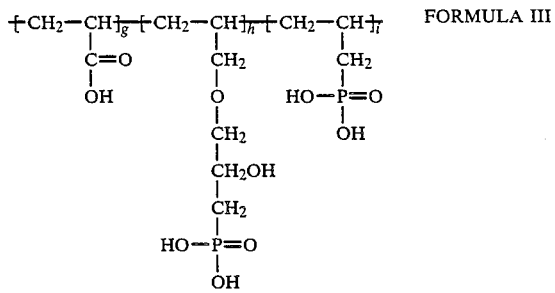

FORMULA III

The polymers should be added to the aqueous system, for which deposit control activity or inhibiting the corrosion of metal parts in contact with an aqueous medium, is desired, in an amount effective for the purpose. This amount will vary depending upon the particular system for which treatment is desired and will be influenced by factors such as, the area subject to deposition, pH, temperature, water quantity and the respective concentrations in the water of the potential scale and deposit forming species. For the most part, the polymers will be effective when used at levels of about 0.1–500 parts per million parts of water, and preferably from about 1.0 to 100 parts per million of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may also be effectively utilized in scrubber systems and the like wherein the formation and deposition of scale forming salts is a problem. Other possible environments in which the inventive polymers may be used include heat distribution type sea water desalting apparatus and dust collection systems in iron and steel manufacturing industries and as a dispersant in the pulp and paper processing industries. Also the polymers could be used as mineral beneficiation aids such as in iron ore, phosphate, and potash recovery.

EXAMPLES

The invention will be further described with reference to a number of specific examples which are to be regarded solely as illustrative, and not as restricting the scope of the invention.

EXAMPLE 1

Preparation of Diethyl Oxiranylmethyl Phosphonate (OMPDE)

A suitable reaction flask was equipped with a reflux condenser, magnetic stirrer, thermometer, nitrogen inlet and addition port. 52 g of 90% diethyl allyl phosphonate (0.26 mole) and 865 g of chloroform were charged to the flask. 64 g of 85% m-chloroperbenzoic acid (0.32 mole) was then added to the flask over a 20 minute period at 3–5 C under a nitrogen blanket. After addition, the batch was stirred at room temperature for 88 hours and then cooled to 3 C. The resulting mixture was filtered, and then the filtrate was washed with aqueous sodium bisulfite, aqueous sodium bicarbonate, brine and dried (MgSO$_4$). The organic layer was then concentrated under reduced pressure and distilled through a Vigreux column at 1 mm Hg and 100–103 C. The resulting product was identified by $^{13}$C and $^{31}$P NMR as mainly diethyl oxiranylmethyl phosphonate (OMPDE, 92%).

The 31P NMR showed a major resonance at 27.9 ppm downfield from the external phosphoric acid standard which was assigned to the OMPDE. Residual diethyl allyl phosphonate was observed at 28.1 ppm. A trace amount of phosphate and phosphonate species were also noted at 0.9 and 34.4 ppm. The $^{13}$C NMR showed the OMPDE at 15.9, 29.2 (J=137 Hz), 46.1, 46.2 and 61.0 ppm downfield from external dioxane standard. Diethyl allyl phosphonate was detected at 31.5 (J=139 Hz), 118.9, and 128.7 ppm.

EXAMPLE 2

Preparation of Diethyl Allyloxy Hydroxypropyl Phosphonate (AHPPODE) and Diethyl Allyl Phosphonate Mixed Monomer Solution Utilizing the apparatus described in Example 1, 39 g of product from Example 1 (92% OMPDE, 0.19 mole) and 200 g of allyl alcohol (3.41 mole) were charged to the flask and heated at reflux for about 60 hours. After reaction, residual allyl alcohol was removed via distillation to yield a colorless liquid (48 g). The product contained mainly diethyl allyloxy hydroxypropyl phosphonate (AHPPODE, 90%) and some diethyl allyl phosphonate as verified by NMR.

The $^{31}$P NMR spectrum showed a major resonance at 31.9 ppm which was assigned to AHPPODE. Diethyl allyl phosphonate (28.9 ppm) and either the secondary isomer of AHPPODE, or diethyl 2,3-dihydroxypropyl phosphonate (from hydrolysis of the OMPDE) (32.5 ppm) was also detected. A small amount of phosphate and phosphonate compounds were noted at 0.9 and 35.3 ppm. The 13C NMR showed the AHPPODE at 16.1, 30.5 (J=139 Hz), 61.2, 65.3, 71.7, 74.4 (J=13 Hz), 115.6 and 135.3 ppm. Diethyl allyl phosphonate was detected at 119 and 129 ppm. A trace of residual allyl alcohol (62.4, 112.9 and 140 ppm) was also observed.

EXAMPLE 3

Preparation of Allyloxy Hydroxypropyl Phosphonic Acid (AHPPO) and Allyl Phosphonic Acid (APA) Mixed Monomer Solution Utilizing the apparatus described in Example 1, 48 g of solution of Example 2 (90% AOHPPA, 0.17 mole) and 270 g of dried carbon tetrachloride were charged to the reaction flask. 95 g of bromotrimethylsilane (0.61 mole) was then added over one hour while maintaining a temperature of 16-20 C. After the addition, the batch was heated at 40 C for 90 minutes and then concentrated in vacuo. Methanol and deionized water were then added and the solution was again concentrated in vacuo to yield a clear liquid (53 g). The weight of the product was then adjusted to 100 g with deionized water. The product was identified by $^{13}$C and 31P NMR as containing mainly allyloxy hydroxypropyl phosphonate (AHPPO, 88%). The concentration of the solution was analyzed to be 34.4% solids.

The $^{31}$P NMR spectrum showed a major resonance at 28.65 ppm which was assigned to the primary AHPPO. Two minor resonances at 29.00 ppm and 28.13 ppm were assigned the secondary AHPPO isomer and allyl phosphonic acid (APA), respectively. A trace amount of other phosphate and phosphonate compounds were also noted at 1.32, 30.50 and 35.58 ppm. The $^{13}$C NMR showed the primary AHPPO at 31.00 (J=137 Hz), 65.58, 71.87, 73.71 (J=14 Hz), 118.29, and 133.90 ppm. Allyl phosphonic acid was detected at 32.0 (J=133 Hz),, 120.0 and 128.0 ppm. The IR spectrum showed a weak C—P stretch at 770 cm$^{-1}$.

EXAMPLE 4

Preparation of Acrylic Acid/Allyloxy Hydroxypropyl Phosphonic Acid/Allyl Phosphonic Acid Terpolymer Molar Ratio 6.42/1.00/0.11

Utilizing the apparatus described in Example 1, but with an overhead stirrer, 24.26 g of the mixed monomer solution from Example 3 (0.0374 mole of AHPPO, and 0.0041 mole of APA), 36.96 g of deionized water and 1.28 g of isopropanol were charged to the flask. The resulting solution was then heated to a slight reflux ( 95 C) under a nitrogen blanket. 17.65 g of acrylic acid (0.24 mole) and 12.05 g of sodium persulfate solution (17%) were then charged to the flask over a period of 3.5 hours. After the addition, the reaction mixture was held at a slight reflux for 1.5 hours, followed by the removal of 7.71 g of an isopropanol/water azeotrope. The reaction mixture was then cooled to room temperature.

The terpolymer solution, after being diluted with water to 25% solids, had a Brookfield viscosity of 26 cps at 25 C. The resulting product was slightly hazy with a light yellow color. The structure of the terpolymer was verified by $^{13}$C NMR. The spectrum was characterized by a broad, polyacrylic acid type backbone, complex C—O region (62-74 ppm) , broad carbonyl region (178 ppm) and a resonance at 30.8 ppm (J=136 Hz). The $^{31}$P NMR spectrum was similar to that described in Example 3 except there was a broadening in the width of the peaks which indicates that the AHPPO incorporated into the polymer.

Passivation

Although the polymers of the invention, when used singly, may not adequately inhibit corrosion, the demonstrated efficacy of polymers of similar structure (see U.S. 4,659,481) in inhibiting calcium phosphate precipitation is very important. For instance, one successfully established cooling water treatment method provides a passivated film on metal surfaces in contact with the aqueous medium via addition of orthophosphate, organo-phosphonate and an acrylic acid/hydroxylated alkyl acrylate copolymer. Details of such method are disclosed in (May et al.).U.S. Pat. No. 4,303,568. The entire content of this patent is hereby incorporated by reference. Based upon the deposit control efficacy shown by the instant copolymers, as well as the minimum corrosion rates displayed herein in the recirculator studies, it is thought that the subject copolymers can be substituted for the polymers disclosed in the aforementioned May et al. patent so as to provide the important passivated film on the desired metal surfaces.

As is stated in the May et al. patent, the passive film is provided on metal surfaces in contact with the aqueous medium without substantial attendant deposition formed thereon. A composition containing polymer and orthophosphate and optionally but preferably a phosphonate, polyphosphate and copper corrosion inhibitors is used in order to achieve such passivation. A typical composition contains on a weight ratio basis of polymer to orthophosphate expressed as PO$_4$— of about 1:8 to 4:1 and preferably about 1:6 to 2:1. When a polyphosphate* is included, the weight ratio of orthophosphate to polyphosphate on a PO$_4$— basis is 15:1 to 1:3, and preferably 2.3:1 to 1:1. Similarly, if the organophosphonate is included, the ratio of the orthophosphate to the phosphonate expressed as PO$_4$— to PO$_4$— is 1:2 to 13:1, and preferably 2:1 to 8:1. Any copper corrosion inhibitor may be included in the composition (0.01 to 5% by weight) in an amount which will be effective for controlling the copper corrosion in a given system: 0.05 to 10 parts per million and preferably 0.5 to 5 parts per million. Similarly, zinc salts may be included if additional protection is needed. *Betz Handbook of Industrial Water Conditioning, 6th edition, 1962, pp. 394-396, Betz Laboratories, Inc., Trevose, Pa.

In treating the aqueous systems to provide such passivation, the following dosages in parts per million parts of water in said aqueous systems of the respective ingredients are desirable, with the dosages, of course, being based upon the severity of the corrosion problem foreseen or experienced:

orthophosphate (expressed as PO$_4$—): 2 to 50 parts per million parts of water (ppm) and preferably 6 to 30 ppm;

polymer: 0.3 to 120 ppm and preferably 3 to 25 ppm;

polyphosphate (expressed as PO$_4$—): 0.1 to 30, and preferably 3 to 10, parts per million parts of water;

phosphonate (expressed as $PO_4-$): 0.04 to 20, and preferably 1 to 6, parts per million parts of water.

The preferred rate of application of this treatment to cooling water systems and the ratios of various components depends on the calcium concentration of the cooling water. The treatment is preferably applied in waters having between 15 ppm and 1,000 ppm calcium. Within this range the weight ratio of calcium to orthophosphate is varied from 1:1 to 83.3:1, the weight ratio of polymer to orthophosphate is varied from 1:3 to 1.5:1.

The orthophosphate which is critical to passivation aspect of the present invention is generally obtained by direct addition. However, it is understood that the orthophosphate can also arise due to reversion of either inorganic polyphosphates or the organo-phosphonates, or any other appropriate source or precursor thereof.

The above dosages represent the most desirable ranges since most systems will be treatable therewith. Higher dosages are permissible when the situation demands, but of course are most costly. The effectiveness of the inventive treatments are dependent upon the aqueous medium having a pH of 5.5 and above, and preferably 6.5 to 9.5, and containing calcium ion concentrations, preferably about 15 parts per million parts of water. Below this range, it may be necessary for overall effectiveness to add metallic ions such as zinc, nickel, chromium, etc. as described in column 3, lines 4 to 24 of U.S. Pat. No. 3,837,803.

While this invention has been described with respect to particular embodiments thereof, it is apparent that numerous other forms and modifications of this invention will be obvious to those skilled in the art. The appended claims and this invention generally should be construed to cover all such obvious forms and, modifications which are within the true spirit and scope of the present invention.

We claim:

1. Method of controlling the deposition of scale imparting precipitates on the structural parts of a system exposed to an aqueous medium containing or prone to the formation of scale imparting precipitates under deposit forming conditions, said method comprising adding to said aqueous medium, an effective amount for the purpose of an effective water soluble polymer having repeat units of the structure:

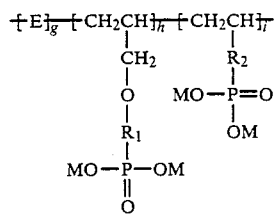

wherein E in the above formula is the repeat unit obtained after polymerization of an $\alpha, \beta$ ethylenically unsaturated compound, $R_1$ is a hydroxy substituted lower alkylene group having from about 1-6 carbon atoms or a non-substituted lower alkylene group having from about 1-6 carbon atoms, M is a water soluble cation, hydrogen or an alkyl group having from 1 to 3 carbon atoms, wherein $R_2$ comprises a lower alkylene ($C_1-C_4$) group and the molar percentage of g in said polymer being between about 40-90 molar %, the molar percentage of h being between 2-50 molar percentage and the molar percentage of i in said polymer being between about 0-25 molar %, the total of g, h and i equalling 100 molar %.

2. Method as recited in claim 1 (wherein E comprises the repeat unit remaining after polymerization of a compound or compounds selected from the group consisting of acrylic acid, acrylamide, maleic acid or anhydride, itaconic acid, methacrylic acid, lower alkyl ($C_1-C_6$) ester or hydroxylated lower alkyl ($C_1-C_6$) ester of said acids.

3. Method as recited in claim 2 wherein E comprises acrylic acid repeat unit and 2-hydroxypropylacrylate repeat unit.

4. Method as recited in claim 1 wherein E comprises acrylic acid repeat unit, $R_1$ comprises 2-hydroxypropylene and $R_2$ comprises methylene.

5. Method as recited in claim 1 wherein M comprises a member selected from the group consisting of H, Na, K, $NH_4^+$, an organic amine group, or an alkyl group having from 1 to 3 carbon atoms.

6. Method as recited in claim 1 wherein said water soluble polymer is added to said aqueous medium in an amount of from about 0.1-500 parts polymer based upon 1 million parts of said aqueous medium.

7. Method as recited in claim 1 wherein said aqueous medium comprises a steam generating system.

8. Method as recited in claim 1 wherein said aqueous medium comprises a cooling water system.

9. Method as recited in claim 1 wherein said aqueous medium comprises a gas scrubbing system.

10. A method according to any one of claims 7, 8 or 9 wherein the scale is or would otherwise have been calcium phosphate.

* * * * *